(12) United States Patent
Jing et al.

(10) Patent No.: US 9,889,533 B2
(45) Date of Patent: Feb. 13, 2018

(54) CLOTH TAKING-UP DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Hui Jing, Beijing (CN); Zhubing Huang, Beijing (CN); Xiaofeng Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 141 days.

(21) Appl. No.: 14/803,901

(22) Filed: Jul. 20, 2015

(65) Prior Publication Data

US 2016/0129543 A1 May 12, 2016

(30) Foreign Application Priority Data

Nov. 6, 2014 (CN) .......................... 2014 1 0624035

(51) Int. Cl.
*B29C 65/48* (2006.01)
*B65H 81/02* (2006.01)
(Continued)

(52) U.S. Cl.
CPC ................ *B24B 7/10* (2013.01); *B29C 65/48* (2013.01); *B65H 81/02* (2013.01); *B65H 81/06* (2013.01); *G02F 1/1303* (2013.01)

(58) Field of Classification Search
CPC ....... B24B 7/10; B24D 18/0072; B29C 65/48; B65H 81/02; B65H 81/06; G02F 1/13; G02F 1/1303; G02F 1/1337
See application file for complete search history.

(56) References Cited

U.S. PATENT DOCUMENTS

2016/0046068 A1* 2/2016 Yu .......................... B29C 63/06
156/247
2016/0114524 A1* 4/2016 Yu ...................... B29C 63/0047
156/60
(Continued)

FOREIGN PATENT DOCUMENTS

CN      102629029 A     8/2012
CN      202443222 U     9/2012
(Continued)

OTHER PUBLICATIONS

Offfice Action dated Oct. 28, 2016 issued in corresponding Chinese Application No. 201410624035.2.

*Primary Examiner* — Timothy V Eley
(74) *Attorney, Agent, or Firm* — Nath, Goldberg & Meyer; Joshua B. Goldberg; Annie Kock (57) ABSTRACT

The invention provides a cloth taking-up device including: a platform, on which glue/cloth to be taken-up are disposed; and a clamp part movable with respect to the platform, which can clamp a roller and roll the glue/cloth to be taken-up successively onto the roller. An outside surface of the platform has an included angle of 0°-180° with respect to the horizontal plane, on which the glue/cloth to be taken-up are disposed, and the clamp part can keep the roller in parallel with the outside surface. The cloth taking-up device can avoid uneven pressure applied to the glue/cloth to be taken-up in the down-press manner, improving uniformity of taken-up glue/cloth. Meanwhile, the foreign matters on the glue/cloth to be taken-up can easily fall off, and the foreign matters on the rollers cannot drop onto the glue/cloth to be taken-up with the rotation, thereby ensuring glue/cloth taking-up quality.

14 Claims, 5 Drawing Sheets

(51) Int. Cl.
*B24B 7/10* (2006.01)
*B65H 81/06* (2006.01)
*G02F 1/13* (2006.01)

(56) References Cited

U.S. PATENT DOCUMENTS

2016/0195738 A1* 7/2016 Xiang .................... G02F 1/1303
                                                             156/247
2017/0023812 A1* 1/2017 Jing ...................... G02F 1/1303

FOREIGN PATENT DOCUMENTS

| CN | 104020610 A | 9/2014 |
| JP | H4-221930 A | 8/1992 |
| JP | 2014-66860 A | 4/2014 |
| KR | 10-2011-0046731 A | 5/2011 |

* cited by examiner

CLOTH TAKING-UP DEVICE

FIELD OF THE INVENTION

The invention relates to the field of manufacturing technologies of liquid crystal display, and in particular to a cloth taking-up device.

BACKGROUND OF THE INVENTION

During a rubbing process of manufacturing display panel, cloth/glue taking-up procedure is an important link in the rubbing process. The cloth/glue taking-up procedure indicates a procedure of rolling rubbing cloth for rubbing formed alignment layer onto a rubbing roller before forming alignment layer by rubbing, for the preparation of the rubbing formed alignment layer. Before rolling the rubbing cloth onto the rubbing roller, usually a layer of double-side adhesive tape is applied to the rubbing roller. The double-side adhesive tape can stick the rubbing cloth subsequently rolled onto the rubbing roller to be firmly fixed thereto. The cloth/glue taking-up efficiency may seriously influence the rubbing process efficiency and alignment effect.

Figure 1:
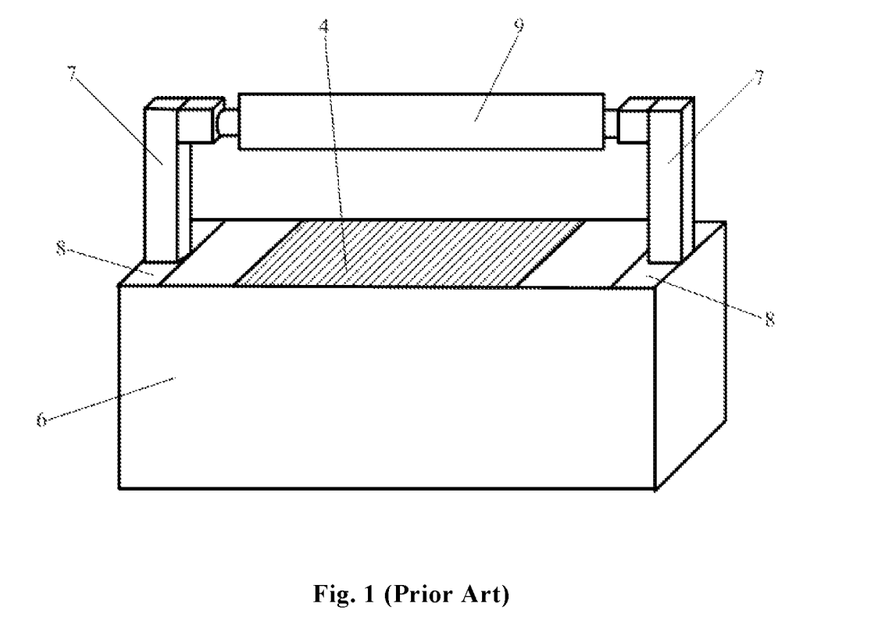
FIG. 1 is schematic diagram showing a cloth taking-up equipment in the prior art.

The cloth/glue taking-up procedure is implemented by a cloth taking-up equipment. Currently mainstream rubbing cloth taking-up equipment implements the cloth/glue taking-up operation in a traditional horizontal down-press manner. As shown in FIG. 1, the rubbing cloth taking-up equipment generally includes a base 6, a lifting/descending device 7 and transmission tracks 8. A top surface of base 6 in parallel with a horizontal plane is configured to be laid by cloth to be taken-up 4 or glue to be taken-up. The lifting/descending device 7 is configured to drive the rubbing roller 9 to move upwards/downwards and roll forwards/backwards, under actions of the transmission track 8, such that the cloth to be taken-up 4 and glue to be taken-up are rolled onto the rubbing roller 9.

Hereafter, specific operations of the rubbing cloth taking-up equipment in the prior art will be described in detail. Firstly, processes of taking up glue are as follows: laying the double-side adhesive tape on the top surface of the base 6, and moving the rubbing roller 9 to an original position (i.e., right above an edge on a start side of the double-side adhesive tape laid on the top surface of the base 6) under the actions of the transmission tracks 8; the lifting/descending device 7 driving the rubbing roller 9 to press down against a surface of the double-side adhesive tape at a certain amount; subsequently, moving the rubbing roller 9 towards an end position (i.e., right above an edge on an end side of the double-side adhesive tape laid on the top surface of the base 6) under the actions of the transmission tracks 8; then, the lifting/descending device 7 lifting the rubbing roller 9 to an initial height. At this point, processes of taking up glue are finished. Next, processes of taking up cloth are performed in the similar manner: laying the cloth to be taken-up 4 on the top surface of the base 6, and moving the rubbing roller 9 to an original position (i.e., right above an edge on a start side of the cloth to be taken-up 4 laid on the top surface of the base 6) under the actions of the transmission track 8; the lifting/descending device 7 driving the rubbing roller 9 to press down against a surface of the cloth to be taken-up 4 at a certain amount; subsequently, moving the rubbing roller 9 towards an end position (i.e., right above an edge on an end side of the cloth to be taken-up 4 laid on the top surface of the base 6) under the actions of the transmission track 8; then, the lifting/descending device 7 lifting the rubbing roller 9 to an initial height. At this point, processes of taking up cloth are finished. The finished rubbing roller 9 may be used in the rubbing procedure to form the alignment layer by rubbing.

Since a length of the rubbing roller is larger with an increase in area of the liquid crystal panel, the down-press amount of the rubbing roller is increased accordingly. Therefore, the down-press cloth/glue taking-up equipment may easily lead to uneven down-press of the rubbing roller, in turn causing that uniformity of the taken-up cloth/taken-up glue may be degraded and cloth/glue dropped off situation may easily occur in partial regions. Therefore, the existing rubbing cloth taking-up equipment seriously influences rubbing quality in the rubbing process. In addition, in a case where the double-side adhesive tape and the rubbing cloth are laid horizontally, if there are foreign matters on the double-side adhesive tape and the rubbing cloth, they will be difficult to fall off; if there are foreign matters on the rubbing roller, they will drop onto the double-side adhesive tape or the rubbing cloth with the rotation, causing that the taken-up glue/taken-up cloth is degraded (for example, air bubbles are formed) due to the foreign matters.

SUMMARY OF THE INVENTION

As for above technical problems in the prior art, there is provided a cloth taking-up device. The cloth taking-up device can avoid pressure applied to the glue to be taken-up and the cloth to be taken-up by rollers in the case of taking up glue and cloth in the down-press manner, improving uniformity of taken-up glue/cloth. Meanwhile, the foreign matters on the glue to be taken-up and the cloth to be taken-up can easily fall off, and the foreign matters on the rollers cannot drop onto the glue to be taken-up and the cloth to be taken-up with the rotation, thereby ensuring glue/cloth taking-up quality.

The cloth taking-up device according to the present invention includes: a platform, on which glue to be taken-up and cloth to be taken-up are disposed; and a clamp part movable with respect to the platform, which is configured to clamp a roller and roll the glue to be taken-up and the cloth to be taken-up successively onto a surface of the roller. An outside surface of the platform has an included angle of 0°-180° with respect to the horizontal plane, the glue to be taken-up and the cloth to be taken-up are disposed on the outside surface of the platform, and the clamp part is capable of keeping the roller in parallel with the outside surface.

Preferably, the platform is of rectangular parallelepiped or cubic shape, the outside surfaces of the platform include a first side surface and a second side surface which are arranged oppositely and which are in parallel with each other and perpendicular to the horizontal plane, and the glue to be taken-up and/or the cloth to be taken-up are laid on each of the first side surface and the second side surface.

Preferably, one or more pieces of glue to be taken-up and/or one or more pieces of cloth to be taken-up are laid on each of the first side surface and the second side surface.

Preferably, the clamp part includes a first clamp mechanism, a second clamp mechanism and a driving mechanism, the first clamp mechanism and the second clamp mechanism being connected to the driving mechanism.

Preferably, the first clamp mechanism and the second clamp mechanism are provided in pair and are capable of simultaneously rotating about the platform in a direction from the first side surface to the second side surface or a direction from the second side surface to the first side surface under the action of the driving mechanism.

Preferably, the clamp part includes n pairs of first clamp mechanism and second clamp mechanism, wherein n≥2, and n is an integer.

Preferably, the outside surfaces of the platform include a third side surface and a fourth side surface which are arranged oppositely and which are in parallel with each other and perpendicular to the horizontal plane, and the first clamp mechanism and the second clamp mechanism are disposed on the third side surface and the fourth side surface, respectively.

Preferably, the first clamp mechanism and the second clamp mechanism are configured to clamp both ends of the roller, and to rotate the roller about the platform in the direction from the first side surface to the second side surface or the direction from the second side surface to the first side surface.

Preferably, the first clamp mechanism includes a first clamp component and a first retractable component which are mutually connected, and the second clamp mechanism includes a second clamp component and a second retractable component which are mutually connected, the first clamp component and the second clamp component are configured to clamp both ends of the roller, and each of the first retractable component and the second retractable component is extendable and retractable in a direction perpendicular to the first side surface and the second side surface, such that the roller moves far away from the first side surface/second side surface or comes into contact with the glue to be taken-up/cloth to be taken-up laid on the first side surface/second side surface.

Preferably, the driving mechanism includes a first driving device and a second driving device which are disposed on the third side surface and the fourth side surface, respectively, the first retractable component is connected to the first driving device, and the second retractable component is connected to the second driving device, and the first driving device and the second driving device are capable of driving the first retractable component and the second retractable component to rotate about the platform in the direction from the first side surface to the second side surface or the direction from the second side surface to the first side surface.

Preferably, the cloth taking-up device further includes a first power source and a second power source, the first power source being configured to drive the first retractable component and the second retractable component to extend or retract; the second power source being configured to drive the first driving device and the second driving device to rotate.

Preferably, the first power source includes an air cylinder, and the second power source includes a motor.

Preferably, the cloth taking-up device further includes a vacuum adsorption part which includes a vacuum adsorption power source and an adsorption plate, the adsorption plate is disposed on the outside surface of the platform and connected to the vacuum adsorption power source via a pipeline, and the vacuum adsorption power source is capable of producing adsorptive force to keep the glue to be taken-up and the cloth to be taken-up on the adsorption plate.

Preferably, the adsorption plate includes a vacuum adsorption felt or a vacuum adsorption sheet rubber.

Preferably, the platform further includes a bottom surface and a top surface, which are parallel to each other and in parallel with the horizontal plane, and the first clamp mechanism and the second clamp mechanism are disposed on the bottom surface and the top surface, respectively.

Preferably, the driving mechanism includes a first driving device and a second driving device which are disposed on the bottom surface and the top surface, respectively.

Preferably, one or more pieces of glue to be taken-up and/or cloth to be taken-up are laid on each of the first side surface, the second side surface, the third side surface and the fourth side surface.

The embodiments of the invention have the following advantages: in the cloth taking-up device according to the invention, by laying the glue to be taken-up and the cloth to be taken-up on the outside surfaces of the platform having an included angle of 0°-180° with respect to horizontal plane and keeping the roller in parallel with the outside surfaces, the glue to be taken-up and the cloth to be taken-up can be rolled onto roller surfaces of the rollers in a lateral-press manner, whereby avoiding uneven pressure applied to the glue to be taken-up and the cloth to be taken-up by rollers in the case of taking up glue and cloth in the down-press manner, and in turn improving uniformity of taken-up glue/cloth. Meanwhile, cloth/glue dropped off situation may not occur in the finished rollers, thereby ensuring the rubbing quality of the rollers in a process of the rubbing formed alignment layer. In addition, since the glue to be taken-up and the cloth to be taken-up are situated in a non-horizontal position, the foreign matters on the glue to be taken-up and the cloth to be taken-up can easily fall off, and the foreign matters on the rollers cannot drop onto the glue to be taken-up and the cloth to be taken-up with the rotation, thereby ensuring glue/cloth taking-up quality.

In the reference numerals:

1—platform; 11—first side surface; 12—second side surface; 13—third side surface; 14—fourth side surface; 15—bottom surface; 16—top surface; 2—clamp part; 21—first clamp mechanism; 211—first clamp component; 212—first retractable component; 22—second clamp mechanism; 221—second clamp component; 222—second retractable component; 23—driving mechanism; 231—first driving device; 232—second driving device; 3—glue to be taken-up; 4—cloth to be taken-up; 5—roller; 6—base; 7—lifting/descending device; 8—transmission track; 9—rubbing roller.

DETAILED DESCRIPTION OF THE EMBODIMENTS

In order to make those skilled in the art better understand the technical solutions of the present invention, a cloth taking-up device according to the invention will be described in detail below in conjunction with the accompanying drawings and specific embodiments.

First Embodiment

Figure 2:
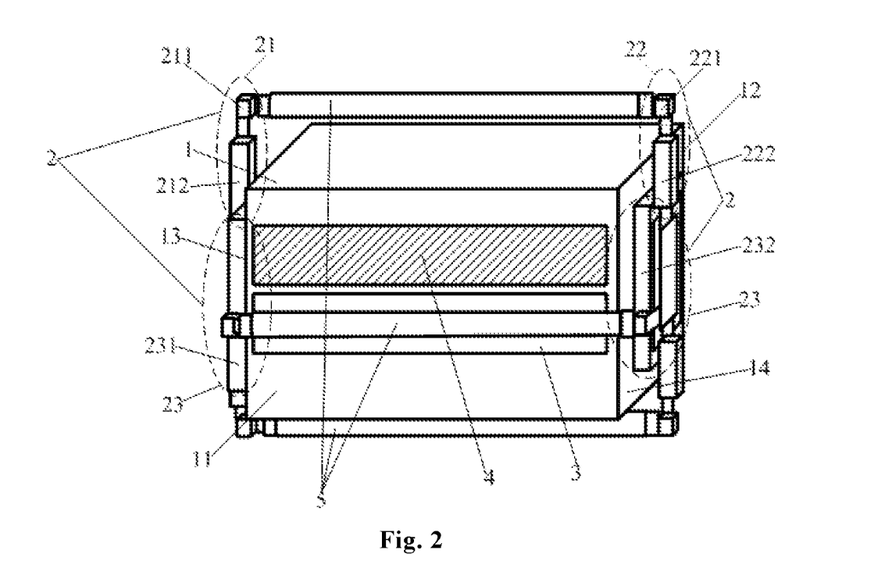
FIG. 2 is a schematic diagram showing a cloth taking-up device according to a first embodiment of the invention.
Figure 3:
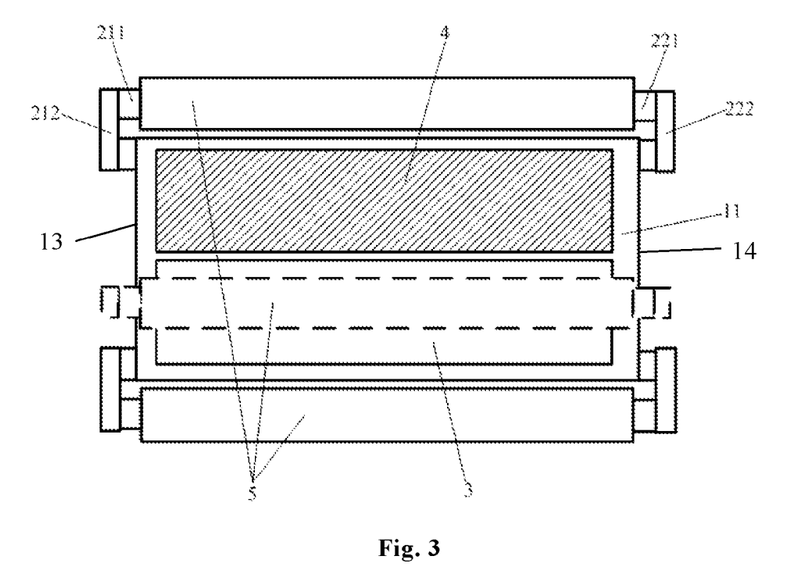
FIG. 3 is a schematic front view of the cloth taking-up device as shown in FIG. 2.
Figure 4:
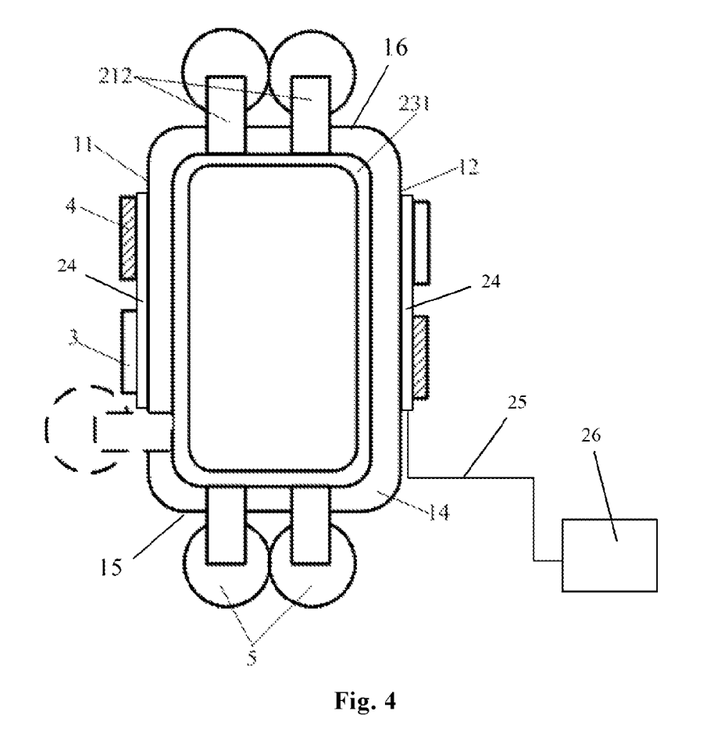
FIG. 4 is a schematic side view of the cloth taking-up device as shown in FIG. 2.

As shown in FIGS. 2-4, this embodiment provides a cloth taking-up device, including: a platform 1, on which glue to be taken-up 3 and cloth to be taken-up 4 are disposed; and a clamp part 2 movable with respect to the platform 1, which is configured to clamp a roller 5 and roll the glue to be taken-up 3 and cloth to be taken-up 4 successively onto a surface of the roller 5. An outside surface of the platform 1 may have an included angle of 0°-180° with respect to the horizontal plane, the glue to be taken-up 3 and the cloth to be taken-up 4 are disposed on the outside surface of the platform 1, and the clamp part 2 is capable of keeping the roller 5 in parallel with the outside surface.

By laying the glue to be taken-up 3 and the cloth to be taken-up 4 onto the outside surface of the platform 1 having the included angle of 0°-180° with respect to the horizontal plane and keeping the rollers 5 in parallel with the outside surface, the glue to be taken-up 3 and the cloth to be taken-up 4 can be rolled onto roller surfaces of the rollers 5 in a lateral-press manner, whereby avoiding uneven pressure applied to the glue to be taken-up 3 and the cloth to be taken-up 4 by rollers in the case of taking up glue and cloth in the down-press manner, and in turn improving uniformity of taken-up glue/cloth. Meanwhile, cloth/glue dropped off situation may not occur in the finished rollers 5, thereby ensuring the rubbing quality of the rollers 5 in a process of the rubbing formed alignment layer. Since the glue to be taken-up 3 and the cloth to be taken-up 4 are situated in a non-horizontal position, the foreign matters on the glue to be taken-up 3 and the cloth to be taken-up 4 can easily fall off, and the foreign matters on the rollers cannot drop onto the glue to be taken-up 3 and the cloth to be taken-up 4 with the rotation, thereby ensuring glue/cloth taking-up quality.

In this embodiment, as shown in FIGS. 2-4, the platform 1 may be of a rectangular parallelepiped shape, and the outside surfaces of the platform 1 may include a first side surface 11 and a second side surface 12 which are oppositely arranged. The first side surface 11 and the second side surface 12 are in parallel with each other and perpendicular to the horizontal plane. The glue to be taken-up 3 and the cloth to be taken-up 4 are laid on each of the first side surface 11 and the second side surface 12. In such an arrangement, it is possible to further improve the uniformity of pressure applied to the glue to be taken-up 3 and the cloth to be taken-up 4 by the rollers 5, such that the glue and the cloth can be uniformly laid on the rollers 5, avoiding the cloth/glue dropped off situation. Meanwhile, it is easy for the first side surface 11 and the second side surface 12 perpendicular to the horizontal plane to make the foreign matters on the glue to be taken-up 3 and the cloth to be taken-up 4 drop off. In addition, since the rollers 5 is in parallel with the first side surface 11 and the second side surface 12, it is possible to avoid the foreign particles on the rollers 5 from dropping onto the glue to be taken-up 3 and the cloth to be taken-up 4 with the rotation, thereby further ensuring glue/cloth taking-up quality In this embodiment, one piece of glue to be taken-up 3 and one piece of cloth to be taken-up 4 are laid on each of the first side surface 11 and the second side surface 12. However, it should be noted that, according to areas and practice demands of the first side surface 11 and the second side surface 12, pieces of glue to be taken-up 3 and pieces of cloth to be taken-up 4 may be laid on each of the first side surface 11 and the second side surface 12.

The clamp part 2 includes a first clamp mechanism 21, a second clamp mechanism 22 and a driving mechanism 23. The first clamp mechanism 21 and the second clamp mechanism 22 are connected to the driving mechanism 23, respectively. The first clamp mechanism 21 and the second clamp mechanism 22 are provided in pair, and disposed on the third side surface 13 and the fourth side surface 14 of the platform 1, respectively. Further, the first clamp mechanism 21 and the second clamp mechanism 22 can simultaneously clockwise rotate about the platform 1 in a direction from the first side surface 11 to the second side surface 12 (with reference to FIG. 4) under the action of driving mechanism 23. The first clamp mechanism 21 and the second clamp mechanism 22 are configured to clamp both ends of the roller 5 and accordingly can clockwise rotate the roller 5 about the platform 1 in the direction from the first side surface 11 to the second side surface 12 (with reference to FIG. 4).

It should be noted, in this embodiment, the third side surface 13 and the fourth side surface 14 are the other two outside surfaces in parallel with each other and perpendicular to the horizontal plane, except for the first side surface 11 and the second side surface 12.

In this embodiment, along the clockwise rotational direction (with reference to FIG. 4) of the roller 5 about the platform 1, the glue to be taken-up 3 and the cloth to be taken-up 4 are successively laid on the first side surface 11, and the glue to be taken-up 3 and the cloth to be taken-up 4 are also successively laid on second side surface 12. As such, when the roller 5 rotates clockwise about the platform 1, the glue to be taken-up 3 and the cloth to be taken-up 4 laid on the first side surface 11 or the second side surface 12 can be successively rolled onto the roller surface of the roller 5. As a result, the cloth/glue taking-up operation of roller 5 is finished.

In this embodiment, the glue to be taken-up 3 and the cloth to be taken-up 4 are laid both on the first side surface 11 and the second side surface 12. Compared to the traditional cloth taking-up equipment, the cloth taking-up device according to this embodiment can roll the glue to be taken-up 3 and the cloth to be taken-up 4 on the first side surface 11 and the second side surface 12 onto different two rollers 5, improving the cloth taking-up efficiency of the cloth taking-up device.

It should be noted that, the first clamp mechanism 21 and the second clamp mechanism 22 can also simultaneously counter-clockwise rotate about the platform 1 in a direction from the second side surface 12 to the first side surface 11 (with reference to FIG. 4) under the action of driving mechanism 23, such that the roller 5 can counter-clockwise rotate about the platform 1 in the direction from the second side surface 12 to the first side surface 11. In this case, along the counter-clockwise rotational direction (with reference to FIG. 4) of the roller 5 about the platform 1, the glue to be taken-up 3 and the cloth to be taken-up 4 are successively laid on the first side surface 11, and the glue to be taken-up 3 and the cloth to be taken-up 4 are also successively laid on second side surface 12. As such, when the roller 5 rotates counter-clockwise about the platform 1, the glue to be taken-up 3 and the cloth to be taken-up 4 laid on the first side surface 11 or the second side surface 12 can be successively rolled onto the roller surface of the roller 5. As a result, the cloth/glue taking-up operation of roller 5 is finished.

In the invention, n pairs of first clamp mechanism 21 and second clamp mechanism 22 may be provided, wherein n≥2, and n is an integer. That is to say, the cloth taking-up device according to the invention may finish the cloth/glue taking-up operation of n rollers 5 at one time. The more pairs of first clamp mechanism 21 and second clamp mechanism 22 are provided, the better taking-up efficiency of the cloth taking-up device is, thereby greatly improving operation rate and productivity of the rubbing process. In this embodiment, as shown in FIG. 3, four pairs of first clamp mechanism 21 and second clamp mechanism 22 are provided.

In this embodiment, the first clamp mechanism 21 may include a first clamp component 211 and a first retractable component 212 which are mutually connected, and the second clamp mechanism 22 may include a second clamp component 221 and a second retractable component 222 which are mutually connected. The first clamp component 211 and the second clamp component 221 are configured to clamp both ends of the roller 5; each of the first retractable component 212 and the second retractable component 222 can be extendable and retractable in a direction perpendicular to the first side surface 11 and the second side surface 12, such that the roller 5 moves far away from the first side surface 11 and the second side surface 12 or comes into contact with the glue to be taken-up 3 and the cloth to be taken-up 4 laid on the first side surface 11 and the second side surface 12. In the process of taking up glue and cloth by the rollers, when the first clamp component 211 and the second clamp component 221 with the rollers 5 clamped rotate to a position right above an edge of the glue to be taken-up 3/cloth to be taken-up 4, the first retractable component 212 and the second retractable component 222 are retracted, such that the roller surfaces of the rollers 5 come into contact with surfaces of the glue to be taken-up 3 and the cloth to be taken-up 4. The rollers 5 start the cloth/glue taking-up operation. When the glue to be taken-up 3 and the cloth to be taken-up 4 are successively rolled onto the rollers 5 with the rotation of the rollers 5, the first retractable component 212 and the second retractable component 222 are extended, such that the roller surfaces of roller 5 move away from the first side surface 11 and the second side surface 12. As a result, the cloth/glue taking-up operation of roller 5 is finished.

In this embodiment, as shown in FIGS. 2 and 4, the driving mechanism 23 may include a first driving device 231 and a second driving device 232 which are disposed on the third side surface 13 and the fourth side surface 14, respectively. The first retractable component 212 is connected to the first driving device 231, and the second retractable component 222 is connected to the second driving device 232. The first driving device 231 and the second driving device 232 can drive the first retractable component 212 and the second retractable component 222 to rotate clockwise about the platform 1 in the direction from the first side surface 11 to the second side surface 12 (with reference to FIG. 4).

In this embodiment, the cloth taking-up device may further include a first power source and a second power source (not shown). The first power source is configured to drive the first retractable component 212 and the second retractable component 222 to extend or retract, and the second power source is configured to drive the first driving device 231 and the second driving device 232 to rotate.

In this embodiment, the first power source may be an air cylinder, and the second power source may be a motor. The air cylinder may drive the first retractable component 212 and the second retractable component 222 to extend or retract by compressed air. The rotation of the motor can drive the first driving device 231 and the second driving device 232 to clockwise rotate.

In this embodiment, the cloth taking-up device may further include a vacuum adsorption part. The vacuum adsorption part may include a vacuum adsorption power source 26 and an adsorption plate 24. The adsorption plate 24 is disposed on the outside surfaces (in this embodiment, the first side surface 11 and the second side surface 12) of the platform 1 and connected to the vacuum adsorption power source 26 via a pipeline 25. The vacuum adsorption power source 26 can produce adsorptive force to keep the glue to be taken-up 3 and the cloth to be taken-up 4 on the adsorption plate 24. The adsorption plate 24 can keep the glue to be taken-up 3 and the cloth to be taken-up 4 flat, facilitating the cloth/glue taking-up operation of roller 5.

In this embodiment, the adsorption plate 24 may include a vacuum adsorption felt or a vacuum adsorption sheet rubber. The vacuum adsorption felt or the vacuum adsorption sheet rubber can keep the glue to be taken-up and the cloth to be taken-up flat by uniformly distributed adsorptive force. Meanwhile, the vacuum adsorption felt or the vacuum adsorption sheet rubber may further have impact absorption property, assisting in cushioning the pressure of the rollers 5 when the rollers 5 come into contact with the surfaces of the glue to be taken-up 3/cloth to be taken-up 4. Therefore, the glue to be taken-up 3 and the cloth to be taken-up 4 may be more uniformly and smoothly rolled onto the roller surface of the rollers 5.

Second Embodiment

Figure 5:
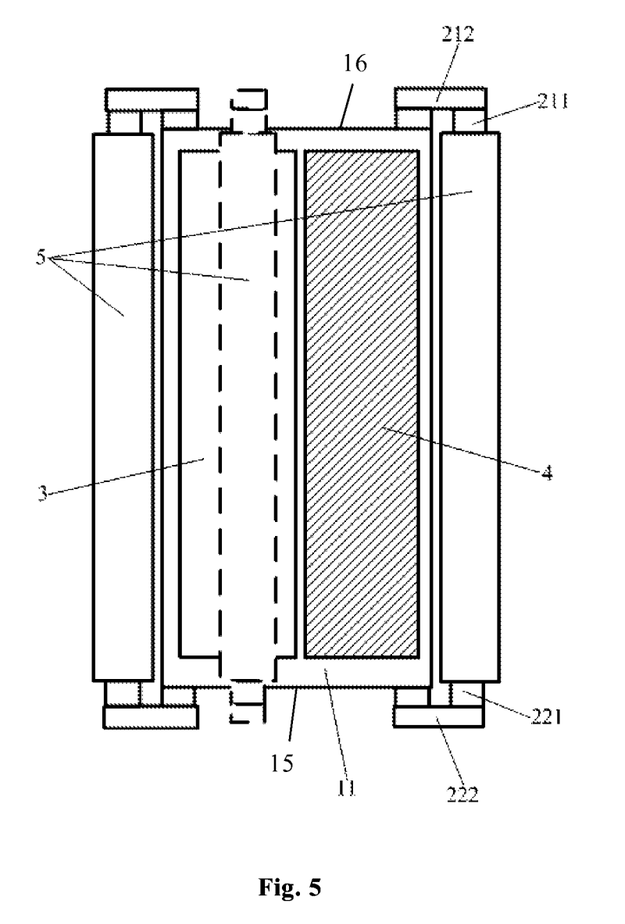
FIG. 5 is a schematic front view showing a cloth taking-up device according to a second embodiment of the invention.
Figure 6:
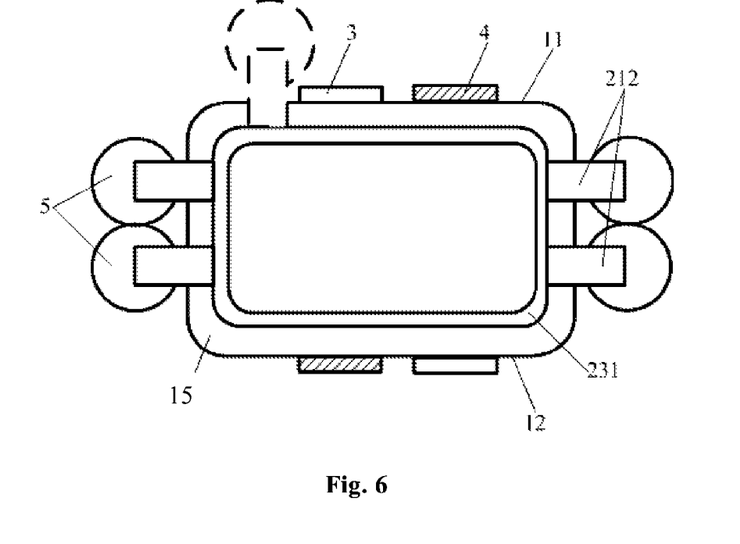
FIG. 6 is another schematic diagram of the cloth taking-up device as shown in FIG. 5.

This embodiment provides a cloth taking-up device. Difference between this embodiment and the first embodiment is in that, as shown in FIGS. 5 and 6, the first clamp mechanism 21 and the second clamp mechanism 22 are disposed on a bottom surface 15 and a top surface 16 of rectangular parallelepiped platform 1, respectively, which are parallel to each other and in parallel with the horizontal plane, rather than disposed on the vertical third side surface 13 and fourth side surface 14.

Other structures of the cloth taking-up device according to the second embodiment are the same as that of the first embodiment, the description of which is omitted herein.

The cloth taking-up device according to this embodiment also may possibly improve the uniformity of pressure applied to the glue to be taken-up 3 and the cloth to be taken-up 4 by the rollers 5, thereby further improving uniformity of taken-up glue/cloth and avoiding the cloth/glue dropped off situation; meanwhile, it is also possible to avoid foreign matters on the rollers 5 from dropping onto the glue to be taken-up 3 and the cloth to be taken-up 4 during the rotation, thereby further ensuring glue/cloth taking-up quality.

Third Embodiment

Figure 7:
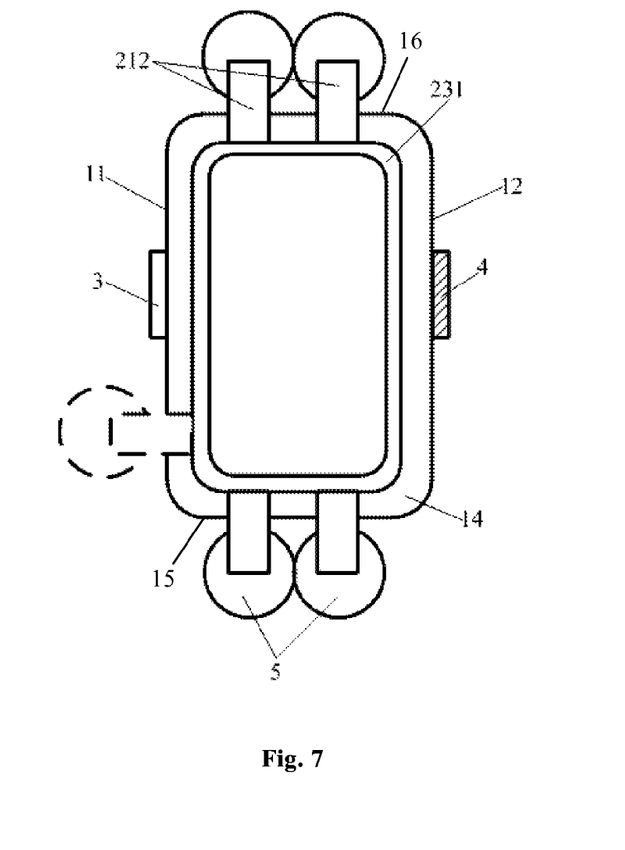
FIG. 7 is a schematic side view showing a cloth taking-up device according to a third embodiment of the invention.

This embodiment provides a cloth taking-up device. Difference between this embodiment and the first embodiment is in that, as shown in FIG. 7, one piece of glue to be taken-up 3 is laid on the first side surface 11, and one piece of cloth to be taken-up 4 is laid on the second side surface 12.

In the cloth taking-up device according to this embodiment, only when the roller 5 clockwise rotates about the platform 1 by a round in the direction from the first side surface 11 to the second side surface 12 (with reference to FIG. 7), the cloth/glue taking-up operation of roller 5 is finished. The cloth taking-up device according to this embodiment is suitable to a case that areas of the first side surface 11 and the second side surface 12 are relatively small. Consequently, either the glue to be taken-up 3 or the cloth to be taken-up 4 is laid on the first side surface 11 and the second side surface 12.

Other structures of the cloth taking-up device according to the third embodiment are the same as that of the first embodiment, the description of which is omitted herein.

Fourth Embodiment

Figure 8:
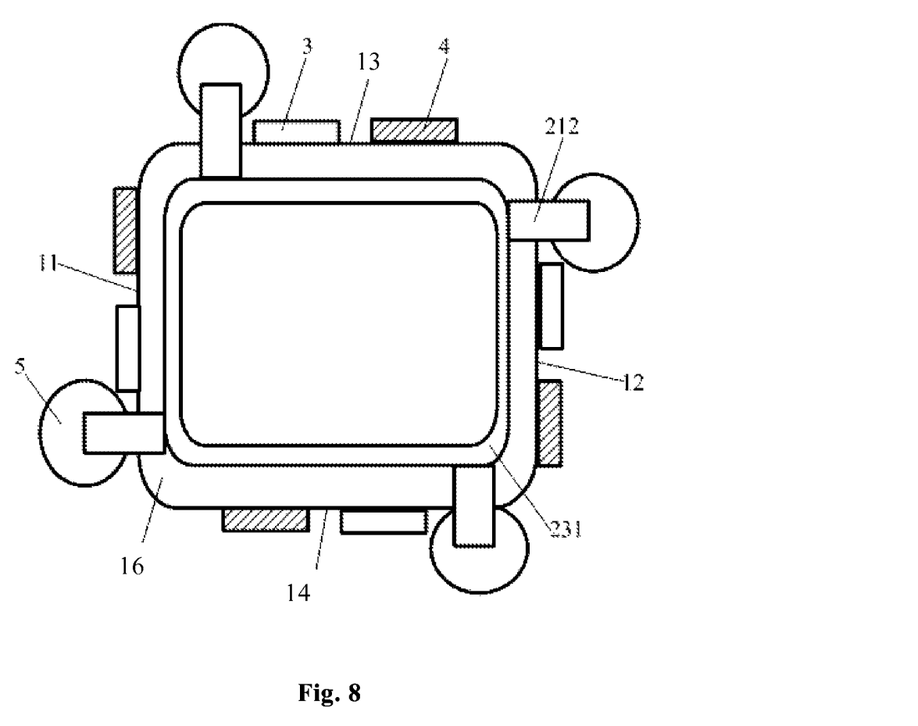
FIG. 8 is a schematic plan view showing a cloth taking-up device according to a fourth embodiment of the invention.

This embodiment provides a cloth taking-up device. Difference between this embodiment and the second embodiment is in that, as shown in FIG. 8, the platform 1 has a cubic shape and the glue to be taken-up 3 and the cloth to be taken-up 4 are laid on each of the first side surface 11, the second side surface 12, the third side surface 13 and the fourth side surface 14.

Of course, either the glue to be taken-up 3 or the cloth to be taken-up 4 may be laid on the first side surface 11, the second side surface 12, the third side surface 13 and the fourth side surface 14, as required.

Other structures of the cloth taking-up device according to this embodiment are the same as that of the second embodiment, the description of which is omitted herein.

In the cloth taking-up device according to this embodiment, as long as four rollers 5 clockwise rotate about the platform 1 by a quarter round (with reference to FIG. 8), the glue to be taken-up 3 and the cloth to be taken-up 4 laid on the first side surface 11, the second side surface 12, the third side surface 13 and the fourth side surface 14 may be rolled onto the roller surface of the rollers 5. As such, four rollers 5 can simultaneously perform the glue/cloth taking-up operation, thereby greatly improving the cloth taking-up efficiency, and in turn greatly increasing the operation rate and productivity of the rubbing process.

The first to fourth embodiments have the following advantages: in the cloth taking-up device according to the first to fourth embodiments, by laying the glue to be taken-up and the cloth to be taken-up on the outside surfaces of the platform having an included angle of 0°-180° with respect to the horizontal plane and keeping the roller in parallel with the outside surfaces, the glue to be taken-up and the cloth to be taken-up can be rolled onto roller surfaces of the rollers in a lateral-press manner, whereby avoiding uneven pressure applied to the glue to be taken-up and the cloth to be taken-up by rollers in the case of taking up glue and cloth in the down-press manner, and in turn improving uniformity of taken-up glue/cloth. Meanwhile, cloth/glue dropped off situation may not occur in the finished rollers, thereby ensuring the rubbing quality of the rollers in a process of the rubbing formed alignment layer. In addition, since the glue to be taken-up and the cloth to be taken-up are situated in a non-horizontal position, the foreign matters on the glue to be taken-up and the cloth to be taken-up can easily fall off, and the foreign matters on the rollers cannot drop onto the glue to be taken-up and the cloth to be taken-up with the rotation, thereby ensuring glue/cloth taking-up quality.

It should be noted that, for the purpose of simply understanding, in context, vertical side surfaces of the rectangular parallelepiped or cubic platform 1 are defined as the first side surface 11, the second side surface 12, the third side surface 13 and the fourth side surface 14, and horizontal side surfaces of the platform 1 are defined as the bottom surface 15 and the top surface 16. However, it should be understood that terms "first", "second" . . . "sixth" used herein are merely intended to distinguish various side surfaces rather than constructed as limiting of the invention.

In addition, it may be readily appreciated by those skilled in the art, the cloth taking-up device of the invention may be slantwise arranged in use. In the case where the cloth taking-up device is slantwise arranged, it is necessarily guaranteed that the first side surface 11, the second side surface 12, the third side surface 13 and/or the fourth side surface 14 on which the glue to be taken-up 3 and the cloth to be taken-up 4 are laid have an included angle of 0°-180° with respect to the horizontal plane.

It could be understood that the above implementations are merely exemplary implementations for the purpose of illustrating the principle of the present invention, and the present invention is not limited thereto. Various modifications and improvements can be made by a person having ordinary skill in the art without departing from the spirit and essence of the present invention. Accordingly, these modifications and improvements also fall into the protection scope of the present invention.

The invention claimed is:

1. A cloth taking-up device, including:
a platform, having a top surface, a bottom surface and outside surfaces, the top surface and the bottom surface being in parallel with a horizontal plane; and
a clamp part movable with respect to the platform, which is configured to clamp a roller, wherein
the outside surfaces of the platform have an included angle of 0°-180° with respect to the horizontal plane, glue to be taken-up and cloth to be taken-up are disposed on the outside surfaces of the platform, and the clamp part is capable of keeping the roller in parallel with the outside surfaces and rolling the glue to be taken-up and the cloth to be taken-up successively onto a surface of the roller.

2. The cloth taking-up device according to claim 1, wherein
the platform is of rectangular parallelepiped or cubic shape, the outside surfaces of the platform include a first side surface and a second side surface which are arranged oppositely and which are in parallel with each other and perpendicular to the horizontal plane, and the glue to be taken-up and/or the cloth to be taken-up are laid on each of the first side surface and the second side surface.

3. The cloth taking-up device according to claim 2, wherein
one or more pieces of glue to be taken-up and/or one or more pieces of cloth to be taken-up are laid on each of the first side surface and the second side surface.

4. The cloth taking-up device according to claim 2, wherein
the clamp part includes a first clamp mechanism, a second clamp mechanism and a driving mechanism, the first clamp mechanism and the second clamp mechanism being connected to the driving mechanism.

5. The cloth taking-up device according to claim 4, wherein
the first clamp mechanism and the second clamp mechanism are provided in pair and are capable of simultaneously rotating about the platform in a direction from the first side surface to the second side surface or a direction from the second side surface to the first side surface under the action of the driving mechanism.

6. The cloth taking-up device according to claim 5, wherein
the clamp part includes n pairs of first clamp mechanism and second clamp mechanism, wherein n≥2, and n is an integer.

7. The cloth taking-up device according to claim 5, wherein
the outside surfaces of the platform include a third side surface and a fourth side surface which are arranged oppositely and which are in parallel with each other and perpendicular to the horizontal plane, and
the first clamp mechanism and the second clamp mechanism are disposed on the third side surface and the fourth side surface, respectively.

8. The cloth taking-up device according to claim 7, wherein
the roller has a first end and a second end; and
the first clamp mechanism and the second clamp mechanism are configured to clamp the first and the second ends of the roller, respectively, and to rotate the roller about the platform in the direction from the first side surface to the second side surface or the direction from the second side surface to the first side surface.

9. The cloth taking-up device according to claim 8, wherein
the first clamp mechanism includes a first clamp component and a first retractable component which are mutually connected, and the second clamp mechanism includes a second clamp component and a second retractable component which are mutually connected,
the first clamp component and the second clamp component are configured to clamp both ends of the roller, and
each of the first retractable component and the second retractable component is extendable and retractable in a direction perpendicular to the first side surface and the second side surface, such that the roller moves far away from the first side surface/second side surface or comes into contact with the glue to be taken-up/cloth to be taken-up laid on the first side surface/second side surface.

10. The cloth taking-up device according to claim 9, wherein
the driving mechanism includes a first driving device and a second driving device which are disposed on the third side surface and the fourth side surface, respectively,
the first retractable component is connected to the first driving device, and the second retractable component is connected to the second driving device, and
the first driving device and the second driving device are capable of driving the first retractable component and the second retractable component to rotate about the platform in the direction from the first side surface to the second side surface or the direction from the second side surface to the first side surface.

11. The cloth taking-up device according to claim 10, wherein
the cloth taking-up device further includes a first power source and a second power source, the first power source being configured to drive the first retractable component and the second retractable component to extend or retract; the second power source being configured to drive the first driving device and the second driving device to rotate.

12. The cloth taking-up device according to claim 11, wherein
the first power source includes an air cylinder, and the second power source includes a motor.

13. The cloth taking-up device according to claim 1, wherein
the cloth taking-up device further includes a vacuum adsorption part which includes a vacuum adsorption power source and an adsorption plate,
the adsorption plate is disposed on the outside surface of the platform and connected to the vacuum adsorption power source via a pipeline, and
the vacuum adsorption power source is capable of producing adsorptive force to keep the glue to be taken-up and the cloth to be taken-up on the adsorption plate.

14. The cloth taking-up device according to claim 13, wherein
the adsorption plate includes a vacuum adsorption felt or a vacuum adsorption sheet rubber.

* * * * *